(12) United States Patent
Stademann

(10) Patent No.: US 6,498,844 B1
(45) Date of Patent: Dec. 24, 2002

(54) METHOD AND SYSTEM OF DYNAMIC TRAFFIC CONTROL IN A COMMUNICATION NETWORK

(75) Inventor: Rainer Stademann, Egmating (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/308,551

(22) PCT Filed: Nov. 3, 1997

(86) PCT No.: PCT/DE97/02544

§ 371 (c)(1),
(2), (4) Date: May 20, 1999

(87) PCT Pub. No.: WO98/24246

PCT Pub. Date: Jun. 4, 1998

(30) Foreign Application Priority Data

Nov. 22, 1996 (DE) .......................................... 196 48 478

(51) Int. Cl.⁷ ............................................... H04M 7/00
(52) U.S. Cl. ............................... 379/220.01; 379/221.02
(58) Field of Search .......................... 379/219, 220.01, 379/221.01, 221.03, 230

(56) References Cited

U.S. PATENT DOCUMENTS

| | | | |
|---|---|---|---|
| 4,669,113 A | 5/1987 | Ash et al. | |
| 5,142,570 A | 8/1992 | Chaudhary et al. | |

FOREIGN PATENT DOCUMENTS

| | | |
|---|---|---|
| EP | 0 229 494 | 7/1987 |
| EP | 0 696 147 | 2/1996 |
| WO | WO 93/08666 | 4/1993 |

OTHER PUBLICATIONS

B.–U. Langnickel et al., "Auf Alternativwegen zu mehr Gewinn", Telecom Report (Siemens), Sep. 1, 1995, vol. 18, No. 5,244–247 at 245. No Translation.

H.L. Hartmann, "Dynamische Nichthierarchische Verkehrslenkung", Nachrichtentechnische Zeitschrift (NZT), Oct. 1, 1991, vol. 44, No. 10, 724–732 at 725. No Translation.

*Primary Examiner*—Creighton Smith
(74) *Attorney, Agent, or Firm*—Shaw Pittman LLP

(57) ABSTRACT

The dynamic routing of a communication network should adapt to the traffic load existing in the network such that the network throughput is optimized. The inventive routing method solves this problem by a dynamic path fan, with alternate paths, upon whose only specifically selected alternate paths are incorporated.

12 Claims, 1 Drawing Sheet

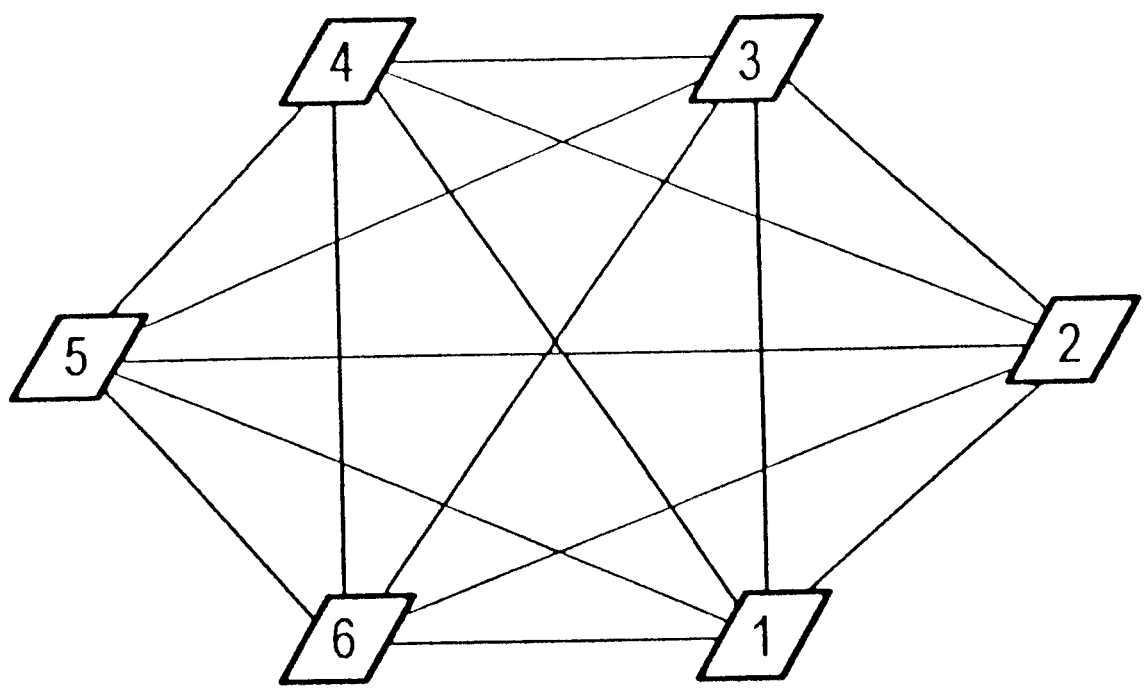

METHOD AND SYSTEM OF DYNAMIC TRAFFIC CONTROL IN A COMMUNICATION NETWORK

BACKGROUND OF THE INVENTION

1. Field of the Invention

The present invention is directed to a method for dynamic traffic routing in a communication network.

2. Description of the Prior Art

In a fully interworked, non-hierarchic network with n network nodes, n-2 alternate paths with only 2 path sections exist for every source-destination pair. Given a lopsided loaded network some of the total of the n×(n−1)×(n−2) alternate paths network-wide are under-loaded and other paths are overloaded.

Non-hierarchically organized, line-switching communication networks require dynamic routing that adapts to the traffic load present in the network such that the network throughput is optimized. In particular, lopsided load situations must thereby also be defused by the routing.

As in conventional routing in hierarchic networks, an initial attempt is also made in dynamic routing to set up connections via one or more scheduled paths that are usually direct paths. When this is not possible because, for example, all connecting line bundles of the direct path are completely occupied, the overflow traffic is assigned to alternate paths.

The principal difference between dynamic and conventional routing lies in the selection of the alternate paths. In conventional routing, administratively defined alternate paths are searched for an unoccupied line respective an unoccupied channel in a rigid sequence ("fixed alternate routing"). As a result thereof, the routing can only react very unsatisfactorily to unplanned, extraordinary load situations.

In dynamic routing, arising overload traffic is assigned to one or more active alternate paths. This active alternate path or, these active alternate paths are not fixed but are selected according to the respective method for dynamic routing or are even redefined at every call. The advantages of dynamic routing lie in its ruggedness and flexibility in response to lopsided load situations in the network that can arise, for example, due to temporally fluctuating loads (for example, spatially limited, strong traffic volume resulting from, for example, catastrophes) and network degradation (for example, outages of connecting line bundles and outages of switching units). Moreover, uncertainties in the network planning can be compensated better.

Central, status-controlled (dynamic) routing methods are supported on a network-central processor that receives information about the existing, local load situation from the network nodes. Beneficial, under-utilized paths can thus be centrally identified and the network nodes can be correspondingly informed. What is thereby disadvantageous, among other things, is the great outlay for network-central processors, data transmission and additionally required calculating capacity in the network nodes.

Decentralized, status-controlled (dynamic) routing methods are based on the answerback of load conditions of the trunk groups to the originating node of the non-hierarchic (sub-) network. These methods have the disadvantage that the non-standardized interface between the network nodes requires a uniform network (for example, network nodes of only one manufacturer), and also a requirement for high signaling outlay.

Decentralized, event-controlled (dynamic) routing methods can achieve a performance enhancement in that they learn the respective load situation by evaluating all trunks busy events (blocking events). However, a distinction is thereby not made between sporadic blockings (caused by statistical fluctuations of the offered traffic) and nearly complete blocking (caused by lopsided load or partial network overload).

European Application EP 0 696 147 A1 discloses a decentralized, event-controlled method for dynamic traffic routing in a communication network. Since the alternate paths are re-selected given a re-initialization and there is no status information in the selection, it is possible in this method that alternate paths that are blocked long-term can be re-activated. Given these re-activated alternate paths, it is therefore determined either already at the first call or at least after a few calls, given a renewed offering of calls, that the alternate path is no longer available and that it must therefore be removed again from the path fan.

SUMMARY THE INVENTION

An object of the present invention is to avoid the above-identified disadvantages in the prior art. Another object of the present invention is to provide a method of uniformly distributing overflow traffic onto optimally low-occupancy alternate routes better than hitherto.

This object is achieved in accordance with the invention in a method in which highly loaded alternate paths are not as quickly re-introduced into the path fans as less loaded alternate paths.

DESCRIPTION OF THE DRAWINGS

FIG. 1 is a block diagram of a fully interwork communication network constructed and operated in accordance with the invention.

DESCRIPTION OF THE PRESENTLY PREFERRED EMBODIMENT

FIG. 1 shows a block diagram of a small, fully interworked network with six network switching nodes 1, 2, 3, 4, 5, and 6 and the corresponding capacities of the path sections or links A, B, C, D, E, F, G, H, I, J, K, L, M, N, and O between the network nodes 1, 2, 3, 4, 5, and 6, whereby a link A, B, C, D, E, F, G, H, I, J, K, L, M, N, and O comprises at least one trunk group.

Let it then be assumed that the switching node 1 has a call for switching node 2 but the direct route of link A between the two switching nodes is not available.

Let it also be assumed that the initial path fan, i.e. the fan of the active alternate paths, comprises three alternate paths after its most recent re-initialization, namely the two-link alternate paths B and F, C and G, D and H via the switching nodes, 3, 4 and 5.

Let it also be assumed that the overflowing traffic is uniformly cyclically distributed onto these active alternate paths B and F, C and G, D and H by the routing system, namely in the sequence transit nodes 3, 4, and 5.

Under these assumptions, the routing system initially checks at the switching node 1 to see whether the active alternate path B and F via transit node 3 is available, i.e. whether it comprises free lines or, channels that can be seized (only "channels" are mentioned below).

In order to be able to check this, the routing system in switching node 1 stores the maximum capacity of the link B between switching nodes 1 and 3, namely, for example, 125 channels, and the trunk reservation parameter for this link B; which may be assumed here to be 10. Over and above this, the routing system stores the number of channels used to the moment. From the viewpoint of the routing system, the link B between switching nodes 1 and 3 is available for overflow traffic when the sum of used channels and the trunk reservation parameters is less than 125 (the trunk reserving guarantees the stability of a routing method in the high-traffic range).

When the first link B is available, then the switching node 1 initially sets up the connection to the switching node 3. Before continuing the connection setup to the destination switching node 2, the routing system of the switching node 3 then checks the availability of the second link F in that it checks whether the sum of occupied channels plus trunk reservation parameter is smaller than the capacity of the second link F. To this end, the routing system of the switching node 3 knows the maximum capacity of the link F between switching nodes 3 and 2, the trunk reservation parameter of this link F and the number of channels of this link F that are occupied at the moment.

When the second link F of said active alternate path is also available, the connection is set up from the transit node 3 to the destination node 2.

In this case, upon the successful switching of the calls via transit node 3, another attempt given the next call for the switching node 2 and non-availability of the direct route A is made to route the overflowing call via the transit node 3. The number of calls successfully offered to the alternate path C and G in immediate succession is counted. A cyclical change is carried out only when a prescribable maximum number of successfully offered calls is reached, i.e. the next overflowing call is then routed via the next active alternate path C and G; i.e. the active alternate path C and G via transit node 4. As a result thereof, brief-duration auto-correlations in the traffic offering on the second link F can be used to enhance the probability that a further connection on the same path B and F can be set up immediately after a successful connection setup.

When the non-availability of an alternate path B and F is found before said maximum number is reached (transit node 3, for example, determines that the link F to the destination node 2 is not available and clears down the connecting section to the originating node 1 with a specifically identified crankback message), then the alternate path B and F is removed from the path fan.

After the occurrence of a specific event (for example, command from network management or expiration of a time period) and/or a specific condition (for example, downward transgression of a predetermined number of alternate paths in the path fan), the path fan is re-initialized in that alternate paths are first again accepted from the first passive set into the path fan and, if this is inadequate for filling the path fan, alternate paths are also accepted again into the path fan from the second passive set, whereby said acceptance of the alternate paths ensues according to the time sequence of their deactivation, i.e. of their removal from the path fan.

When the transit node 3 finds that the link F to the destination node 2 (second link) is not available, the transit node 3 releases the connecting section B to the originating node 1 with a specifically identified crankback message. In response thereto, the routing system of the originating node 1 removes the alternate path B and F via the transit node 3 from the path fan for destination node 2. The alternate path B and F removed from the path fan because of the non-availability on the second link F is in turn handled as explained above.

Although modification and changes may be suggested by those of ordinary skill in the art, it is the intention of the inventors to embody within the patent warranted hereon all changes and modifications as reasonably and properly come within the scope of their contribution to the art.

What is claimed is:

1. A method for dynamic traffic routing in a communication network, said method comprising the steps of:
    a) offering calls between an originating switching node and a destination switching node to at least one preferred scheduled path;
    b) offering calls according to a specific selection pattern to at least one alternate path that is contained in a path fan when none of said at least one preferred scheduled path is available;
    c) offering overflowing calls to an alternate path of said at least one alternate path selected from said path fan for receiving overflowing calls up to a predetermined maximum number of overflowing calls;
    d) counting a number of calls offered to said alternate path until said predetermined maximum number of overflowing calls is offered, at which time said alternate path is no longer available for overflowing calls;
    e) switching to a next alternate path according to said selection pattern when said alternative path is no longer available for overflowing calls;
    f) removing said alternate paths previously contained in said path fan from said path fan when said alternative paths are no longer available for overflow calls, as unavailable alternative paths; and
    g) re-initializing said path fan after an occurrence of a specific event or condition, wherein when said path fan is re-initialized, unavailable alternate paths are re-accepted into said path fan in accordance with an order of their removal from the path fan.

2. The method for dynamic traffic routing in a communication network according to claim 1, wherein said specific event is a command from network management.

3. The method for dynamic traffic routing in a communication network according to claim 1, wherein said specific event is an expiration of a time period.

4. The method for dynamic traffic routing in a communication network according to claim 1, wherein said specific condition is a downward transgression of a predetermined number of alternate paths in the path fan.

5. The method for dynamic traffic routing in a communication network according to claim 1, wherein the preferred scheduled path is a direct link between the originating switching node and the destination switching node.

6. The method for dynamic traffic routing in a communication network according to claim 5, wherein the at least one alternate path is a two-link path from the originating switching node to an intermediate switching node as a first link, and from the intermediate switching node to the destination switching node as a second link.

7. The method for dynamic traffic routing in a communication network according to claim 6, further comprising the step of:
    switching to a next alternate path according to said selection pattern when the second link of said alternate path said alternative path is no longer available,
    wherein said alternate path is removed from said path fan when either (i) the predetermined maximum number of overflowing calls is reached or (ii) the second link of said alternate path is unavailable.

8. The method for dynamic traffic routing in a communication network according to claim 7, wherein said second link of said alternate path becomes unavailable if a second predetermined maximum number of channels are in use or a trunk reservation parameter is smaller than a capacity for the second link.

9. The method for dynamic traffic routing in a communication network according, to claim 6, further comprising the step of:

switching to a next alternate path according to said selection pattern when the first link of said alternate path said alternative path is no longer available, wherein said alternate path is removed from said path fan when either (i) the predetermined maximum number of overflowing calls is reached or (ii) the first link of said alternate path is unavailable.

10. The method for dynamic traffic routing in a communication network according to claim 9, further comprising the step of:

switching to a next alternate path according to said selection pattern when the first link of said alternate path said alternative path is no longer available, wherein said alternate path is removed from said path fan when either (i) the predeternined maximum number of overflowing calls is reached, (ii) the first link of said alternate path is unavailable, or (iii) the second link of said alternate path is unavailable.

11. A method for dynamic traffic routing in a communication network, said method comprising the steps of:

a) offering calls between an originating switching node and a destination switching node to at least one preferred scheduled path;

b) offering calls according to a specific selection pattern to at least one alternate path that is contained in a path fan when none of said at least one preferred scheduled path is available;

c) offering overflowing calls to an alternate path of said at least one alternate path selected from said path fan for receiving overflowing calls up to a predetermined maximum number of overflowing calls;

d) counting a number of calls offered to said alternate path until said predetermined maximum number of overflowing calls is offered, at which time said alternate path is no longer available for overflowing calls;

e) switching to a next alternate path according to said selection pattern when said alternative path is no longer available for overflowing calls;

f) removing said alternate paths previously contained in said path fan from said path fan when said alternative paths are no longer available for overflow calls, as unavailable alternative paths; and g) upon an occurrence of a specific event or condition, re-accepting previously removed, unavailable alternate paths into said path fan in accordance with an order of their removal from the path fan.

12. A method for dynamic traffic routing in a communication network, said method comprising the steps of:

a) offering calls between an originating switching node and a destination switching node to at least one preferred scheduled path;

b) offering calls according to a specific selection pattern to at least one alternate path that is contained in a path fan when none of said at least one preferred scheduled path is available;

c) offering overflowing calls to an alternate path of said at least one alternate path selected from said path fan for receiving overflowing calls up to a first predetermined maximum number of overflowing calls;

d) counting a number of calls offered to said alternate path until said first predetermined maximum number of overflowing calls is offered, at which time said alternate path is no longer available for overflowing calls;

e) switching to a next alternate path according to said selection pattern when a second predetermined maximum number of channels is in use or a trunk reservation parameter is exceeded for a link in said alternative path, or when the first predetermined maximum number of overflowing calls to said alternate path is reached; and f) removing said alternate paths previously contained in said path fan from said path fan when said alternative paths are no longer available for overflow calls, as unavailable alternative paths.

* * * * *